United States Patent [19]

Yokoyama et al.

[11] Patent Number: 5,043,902
[45] Date of Patent: Aug. 27, 1991

[54] VEHICULAR NAVIGATION APPARATUS

[75] Inventors: Shoji Yokoyama; Akimasa Nanba, both of Anjo, Japan

[73] Assignees: Aisin Aw Co., Ltd.; Kabushiki Kaisha Sinsangyokaihatsu, both of Japan

[21] Appl. No.: 408,503
[22] PCT Filed: Dec. 23, 1988
[86] PCT No.: PCT/JP88/01302
    § 371 Date: Aug. 23, 1989
    § 102(e) Date: Aug. 23, 1989
[87] PCT Pub. No.: WO89/06342
    PCT Pub. Date: Jul. 13, 1989

[30] Foreign Application Priority Data

Dec. 28, 1987 [JP] Japan ................... 62-333045
Dec. 28, 1987 [JP] Japan ................... 62-333046

[51] Int. Cl.⁵ ............................................ G06F 15/50
[52] U.S. Cl. ............................ 364/449; 364/444; 340/988; 340/995; 73/178 R
[58] Field of Search ............... 364/443, 444, 449; 73/178 R; 340/988, 990, 995

[56] References Cited

U.S. PATENT DOCUMENTS

| 4,679,147 | 7/1987 | Tsujii ............................... 340/988 |
| 4,688,176 | 8/1987 | Hirata ............................... 364/449 |
| 4,763,270 | 8/1988 | Itoh et al. .......................... 364/449 |
| 4,774,671 | 9/1988 | Itoh et al. .......................... 340/995 |
| 4,792,907 | 12/1988 | Ikeda et al. ..................... 364/449 |
| 4,812,845 | 3/1989 | Yamada et al. ................... 340/988 |
| 4,878,170 | 10/1989 | Zeevi .............................. 340/995 |
| 4,879,658 | 11/1989 | Takashima et al. .............. 340/988 |
| 4,882,689 | 11/1989 | Aoki .................................. 340/988 |
| 4,882,696 | 11/1989 | Nimura et al. .................... 340/988 |
| 4,893,246 | 1/1990 | Iihoshi et al. .................... 340/988 |

Primary Examiner—Gary Chin
Attorney, Agent, or Firm—Lorusso & Loud

[57] ABSTRACT

A vehicular navigation apparatus includes a distance sensor (1), a steering angle sensor (3), a curve detecting unit (9) provided with inputs of a distance signal and steering-angle signal for calculating a change in vehicle travelling direction by referring to a steering angle - travelling direction conversion table (17), a course exploration unit (13) provided with inputs of present position and destination for performing course exploration based on intersection data, road data and node data, a comparison-decision unit (11) for comparing retrieved course data and results of curve detection, and a guidance processor (15) for executing predetermined guidance processing based on the results of comparison. Thus, it is determined whether the vehicle has turned at a guidance intersection or node on a predetermined course and whether the vehicle is on the predetermined course. If the vehicle has made a correct turn, present position is calculated by performing a distance correction using intersection position data or node data. When it is determined that the vehicle is off course, the driver is so informed and instructions can be given for measures to be taken subsequently.

11 Claims, 9 Drawing Sheets

FIG.4(a)

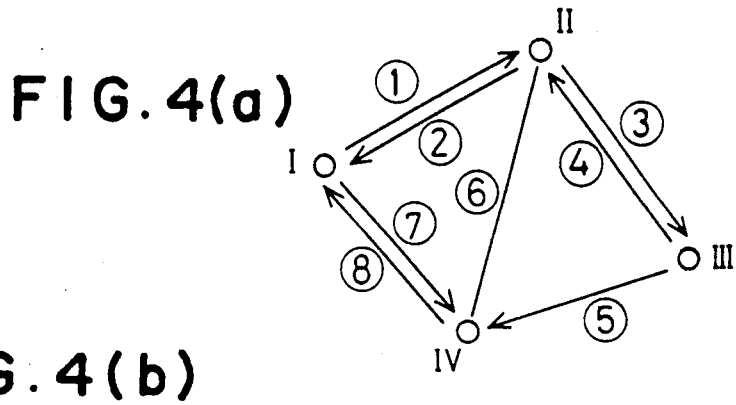

FIG.4(b)

| INTERSEC-TION NO. | INTERSEC-TION NAME | SMALLEST NO. ROAD HAVING THIS INTERSEC-TION AS START-ING POINT | SMALLEST NO. ROAD HAVING THIS INTERSEC-TION AS END POINT | TRAFFIC SIGNAL PRESENT ? |
|---|---|---|---|---|
| I | KANDA | ① | ② | YES |
| II | YUSHIMA | ② | ① | YES |
| III | ○ ○ | ④ | ③ | NO |
| IV | △ △ | ⑥ | ⑤ | NO |

FIG.4(c)

| ROAD NO. | START-ING POINT | END POINT | NO. OF NEXT ROAD HAVING SAME START-ING ROAD | NO. OF NEXT ROAD HAVING SAME END POINT | ROAD WIDTH | PRO-HIBI-TION (1) | PRO-HIBI-TION (2) | GUID-ANCE UN-NECES-SARY | PHO-TO-GRAPH NO. | NUM-BER OF NODES | LEAD-ING AD-RESS OF NODE SE-RIES DATA | LENGTH |
|---|---|---|---|---|---|---|---|---|---|---|---|---|
| ① | I | II | ⑦ | ④ | 1 | — | — | ③ | 1 | 15 | 100 | |
| ② | II | I | ③ | ⑧ | 1 | — | — | ⑦ | 2 | 13 | 200 | |
| ③ | II | III | ② | ③ | 2 | — | — | ⑤ | 3 | 9 | 300 | |
| ④ | III | II | ⑤ | ⑥ | 2 | — | — | ② | 4 | 20 | 500 | |
| ⑤ | III | IV | ④ | ⑦ | 2 | ⑥ | — | ⑧ | 5 | 25 | 600 | |
| ⑥ | IV | II | ⑧ | ① | 1 | ③ | ② | — | 6 | 30 | 700 | |
| ⑦ | I | IV | ① | ⑤ | 0 | — | — | — | 7 | 9 | 800 | |
| ⑧ | IV | I | ⑥ | ② | 0 | — | — | ① | 8 | 3 | 900 | |

FIG.4(d)

| ADDRESS | EAST LONGITUDE | NORTH LATITUDE | ATTRIBUTE |
|---|---|---|---|
| | 135.5 | 35.1 | 01 |
| | 135.6 | 35.2 | 01 |
| 100 | | | |
| ⋮ | | | |
| 200 | | | |
| ⋮ | | | |

FIG. 5(a)

| INTERSECTION NAME |
|---|
| INTERSECTION NO. |
| PHOTOGRAPH NO. |
| ANGLE |
| DISTANCE |
| INTERSECTION NAME |
| ⋮ |

FIG.(b)

| EAST LONGITUDE |
|---|
| NORTH LATITUDE |
| INTERSECTION NO. |
| ATTRIBUTE |
| ANGLE |
| DISTANCE |
| EAST LONGITUDE |
| ⋮ |

YOU HAVE PASSED THE
INTERSECTION
 CHECKING TO SEE IF THERE IS
 A ROAD FROM HERE TO SHISENDO
  PLEASE STOP
  AND WAIT

FIG. 9(a)

NOW CHECKING

PLEASE WAIT

FIG. 9(b)

VEHICULAR NAVIGATION APPARATUS

DESCRIPTION

1. Technical Field

This invention relates to a vehicular navigation apparatus for navigating in accordance with a predetermined route. The navigation apparatus is adapted to enter a number of characteristic points on a course as node data, compare an angle at which the vehicle is to turn at a guidance intersection or node with a detected angle of a turn actually made, calculate present position by performing a distance correction on the assumption that a turn has been made at the intersection or node at which the turn is to be made if the difference between the angles is less than a predetermined value, detect that the vehicle has strayed off course and, if the vehicle is off course, provide instructions with regard to subsequent measures or new course guidance.

2. Background Art

Conventionally, a vehicular navigation apparatus is equipped with a distance sensor for detecting the travelling distance of the vehicle, an orientation sensor such as a geomagnetic sensor or gyro for detecting the travelling bearing of the vehicle, and a map memory device comprising a video disk, video tape CDROM or the like. In the proposed apparatus, map data of a specific region are read out of the map memory device as necessary to display a map image, the travelling trajectory and present position of the vehicle are displayed on the displayed image, the driver visually verifies the vehicle position and confirms the present position, and the present position obtained is compared with the map data to revise the present position or inform the driver, as by means of a buzzer, whether the vehicle has strayed from a predetermined course.

However, if geomagnetism is detected by a geomagnetic sensor in a system in which a predetermined course of travel and the travelling trajectory are displayed, errors in bearing detection can arise at locations where there is magnetic disturbance, as at railroad crossings, along railways and near high-tension lines, or due to magnetization of the vehicle body. As a result, present position cannot be detected with very good precision. In addition, gyros are high in cost. Furthermore, the method of correcting present position by comparing calculated values with map data involves large quantities of data and considerable processing time.

Furthermore, since the vehicle must be driven while the operator constantly verifies whether the vehicle is travelling in accordance with the predetermined course or whether the vehicle has strayed off course, a hazardous situation arises in which the driver is not capable of paying full attention to driving.

With the system in which it is determined whether the vehicle has strayed off the predetermined course and the driver is so informed by a buzzer, there are no instructions given to the driver with regard to what should be done from the point at which the vehicle has gone astray. Consequently, it is difficult for the driver to return and pick up the predetermined course.

The present invention has been devised in order to solve the aforementioned problems and its object is to provide a vehicular navigation apparatus in which distance can be revised accurately at every intersection without being affected by disturbances, present position is calculated with little data, processing speed is improved, straying off course can be quickly determined, it is unnecessary to return to a previously traversed point when a new course is found, it is possible to promptly return to the point at which the vehicle went astray if a new course cannot be found, and the driver is capable of driving the vehicle safely.

DISCLOSURE OF THE INVENTION

To these ends, the vehicular navigation apparatus of the present invention is characterized by comprising a distance sensor, a steering angle sensor, a curve detecting unit provided with inputs of a distance signal and steering-angle signal for calculating a change in vehicle travelling direction by referring to a steering angle-travelling direction conversion table, a course exploration unit provided with inputs of present position and destination for performing course exploration based on intersection data, road data and node data, a comparison-decision unit for comparing retrieved course data and results of curve detection, and a guidance processor for executing predetermined guidance processing based on the results of comparison.

Thus, the present invention is adapted to compare the angle of a turn to be made at a guidance intersection or node on a course with a detected angle, determine, depending upon whether a difference between the angles is less than a predetermined value, if the vehicle has turned at an intersection or node at which a turn is to be made on the course, passed through the intersection or node or turned in the wrong direction at the intersection or node, and calculate, if the turn has been made correctly, the present position by performing a distance correction using the intersection position data or node data. This makes it possible to calculate present position accurately through an inexpensive arrangement using little course data without external influence, and to raise processing speed.

Further, it is determined whether the vehicle is on the predetermined course by compring the predetermined course data and the result of curve detection. When it is judged that the vehicle has strayed off course, the driver is informed by a display or voice track of whether the vehicle has passed through the intersection at which a turn was to be made, turned at the wrong intersection or turned in the wrong direction, and an instruction is given to stop the vehicle. If a new course can be found upon performing course exploration from the point at which the vehicle is stopped to the destination, the new course and the original course are compared and instructions are given, in accordance with the results of the comparison, to travel based on the new course or to return to the point at which the vehicle strayed off course. When a new course cannot be found, instructions are given to return to the point at which the vehicle strayed of course. Thus, the fact that the vehicle has strayed off course can be quickly determined. If a new course can be found, it is not always necessary for the vehicle to return to a previously traversed point. If a new course cannot be found, the vehicle can quickly return to the point at which it went astray. The driver is thus capable of driving at ease by obeying the instructions given.

BRIEF DESCRIPTION OF THE DRAWINGS

FIG. 4(a) is a view of a road network, (b) intersection data, (c) road data, and (d) node series data;

FIG. 5(a) is a view of retrieved guidance intersection data, and (b) a view of retrieved course node series data;

FIGS. 9(a)-9(d) are the views for describing guidance instructions when the vehicle is off course.

BEST MODE FOR CARRYING OUT THE INVENTION

Figure 1:
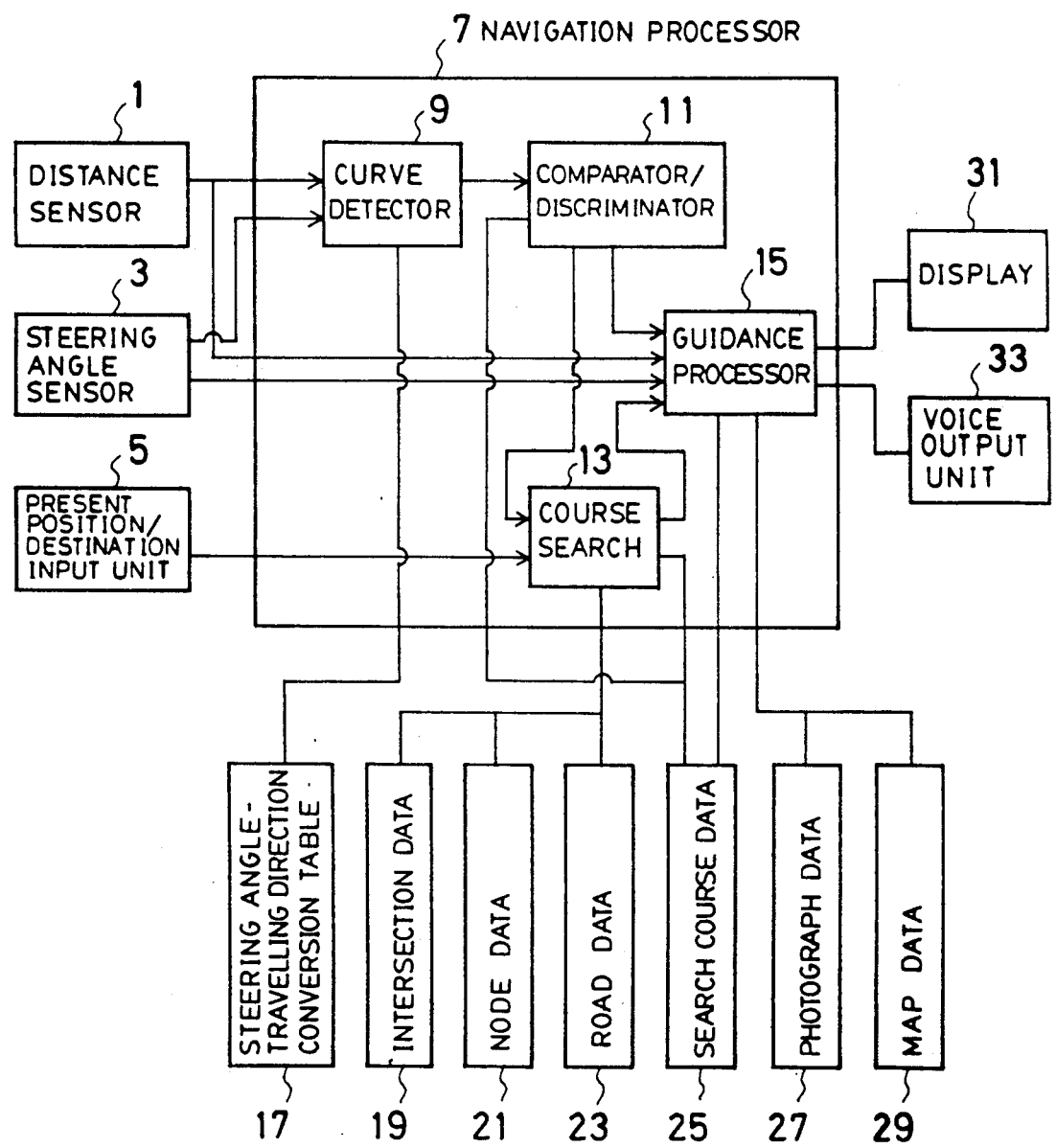
FIG. 1 is a view illustrating the construction of a vehicular navigation apparatus having means for providing guidance when the vehicle is off course in accordance with the present invention.

FIG. 1 is a view illustrating the construction of a vehicular navigation apparatus according to the present invention, in which numeral 1 denotes a distance sensor, 3 a steering angle sensor, 5 a present location/destination input unit, 7 a navigation processing unit, 9 a curve detector, 11 a comparator-decision unit, 13 a course exploration unit, 15 a guidance precessor, 17 a steering angle-travelling direction conversion table, 19 an intersection data file, 21 a node data file, 23 a road data file, 25 an exploration course data file, 27 a photograph data file, 29 a map data file, 31 a display unit and 33 a voice output unit.

The distance sensor 1 measures the travelling distance of a vehicle. For example, the distance sensor can be one which senses and counts the revolution of a wheel, or which senses acceleration and subjects the result to double integration. Other measuring means may be employed as well. The steering angle sensor 3 senses whether or not a turn has been made at an intersection. For example, this can be an optical rotation sensor or rotatable resistor mounted on a rotating portion of a steering wheel, or an angle sensor mounted on a wheel portion. The present location/destination input unit 5 is a joy stick, key or touch panel, or means coupled with the screen of a display unit 8 for displaying keys or a menu on the screen so that inputs can be made from the screen.

The navigation processing unit 7 forms the nucleus of the navigation apparatus and has the curve detector 9, comparator-discriminator unit 11, a course exploration unit 13 and a guidance processor 15.

The course guidance unit 13 is so adapted that when present location and destination are entered from the input unit 5, course search is performed upon reading intersection data, node data and road data, of the kind described below, out of respective files, and the searched course is stored in the file 25. As will be described below, the curve detector 9 reads detection outputs from the distance sensor 1 and steering angle sensor 3 and detects a change in vehicle heading upon referring to the steering angle-travelling direction conversion table 17.

The comparator-discriminator unit 11 compares the angle of an intersection or the angle of a node on a course, which has been retrieved in the vicinity of a guidance intersection or between guidance intersections on the course, with an angle detected by the curve detector 9 and, if the difference between the two angles is less than a predetermined value, decides that a turn has been made correctly at an intersection or node. Further, the comparator-discriminator unit 11 determines whether or not the vehicle is travelling along the course by comparing course data, which has been retrieved in the vicinity of a guidance intersection or between guidance intersections on the course, and travel data from the curve detector 9.

The guidance processor 15 calculates present position by performing a distance correction using intersection data or node data when it has been decided by the comparator-discriminator unit 11 that a turn has been made correctly. Present position in this case is calculated as the distance from the intersection at which the last turn was made. Further, when necessary, the guidance processor 15 displays the calculated present position or causes a voice track indicative thereof to be produced. In addition, the guidance processor executes processing for successively projecting guidance intersections of a retrieved course or characterizing photographs along the course, displaying guidance maps, displaying distance remaining to the next intersection and other guidance information, broadcasting guidance by voice from the voice output unit 25, displaying a message to the effect that the vehicle has strayed off course when this event is detected, or informing the driver by voice that the vehicle has strayed off course, and providing the driver with subsequent instructions, as will be set forth later.

Figure 2A:
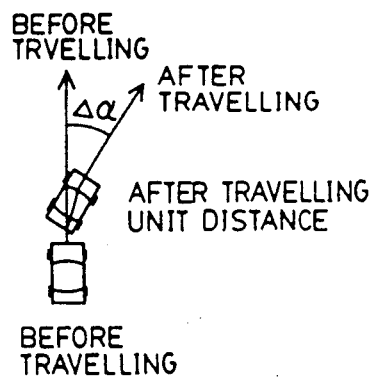
FIGS. 2(a) and 2(b) illustrate a change in travelling direction, per unit distance, versus to steering angle.
Figure 2B:
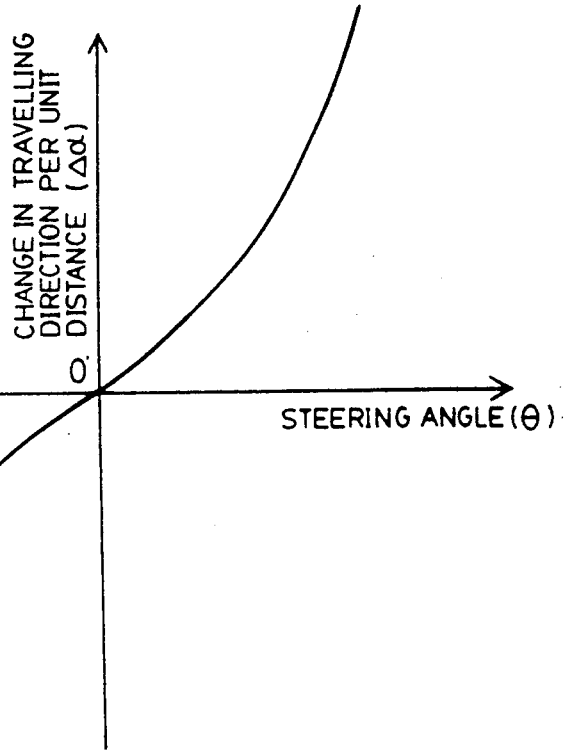
Figure 3:
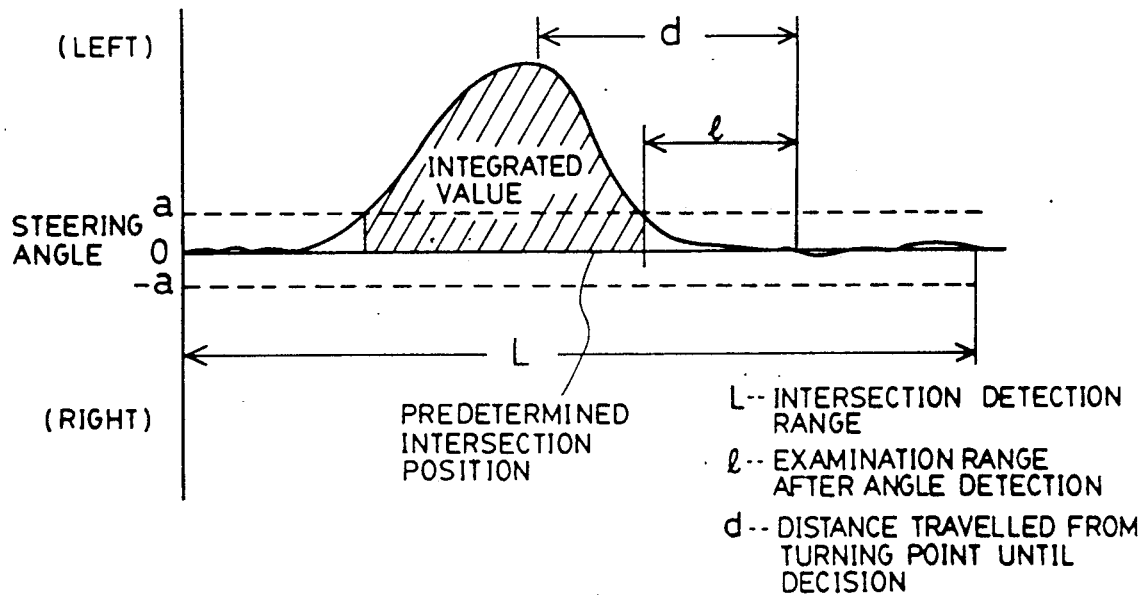
FIG. 3 is a view for describing calculation of a change in travelling direction.

The processing performed by the curve detector will now be described with reference to FIGS. 2 and 3.

Upon receiving inputs of detection signals from the distance sensor 1 and steering angle sensor 3, the curve detector 9 calculates a change in the travelling direction of the vehicle by referring to the steering angle-travelling direction conversion table 17. As shown in FIG. 2, the steering angle-travelling direction conversion table 17 is for converting steering angle $\theta$ into a change $\Delta\alpha$ in travelling direction per unit of distance. As shown in FIG. 3, the curve detector 9 adds up (integrates) $\Delta\alpha$ with respect to the detected steering angle from the moment the steering angle exceeds a certain threshold value a until the moment the steering angle returns to the threshold value. How much the travelling direction of the vehicle changes from the moment the steering wheel starts being turned until the moment the steering wheel returns is calculated based on the integrated value. In FIG. 3, L represents intersection detection range, l denotes a fixed distance travelled after the steering wheel is returned, this taking into account a lane change or the like within examination limits following angle detection, and d represents distance travelled from a turning point until a decision is rendered.

The comparator-discriminator unit 11 compares the calculated change in travelling direction and the intersection angle of the road at an intersection angle at which a turn is to be made (which angle is read out of each file), namely the direction in which the vehicle is to proceed, and checks to see whether there is a difference in excess of a predetermined value between these compared quantities. If the difference is less than the predetermined value, it is judged that the vehicle turned at an intersection or node at which the turn was to be made. If the difference is greater than the predetermined value, it is judged that a turn was made at the wrong intersection. The results are displayed on the display unit 8 or indicated to the driver by voice using the speaker 10.

Intersection data, node data and road data used in course exploration will now be described.

The intersection data constitute information such as the roads that cross at an intersection, the node data constitute information regarding pedestrian crossings and tunnels that can be detected by sensors at characteristic points along the source, and the road data constitute information relating to starting points, end points and the roads between them.

FIG. 4 shows views illustrating examples of a road network, intersection data, road data and node series data.

In order for the driver to accurately grasp vehicle distance from the present position to the destination at all times, the intersection data will have the data configuration shown in (b) of FIG. 4, the road data will have the data configuration shown in (c), and the node data will have the data configuration shown in (d) in a case where a road network comprises, e.g., road numbers ①-⑧ of intersection numbers I-IV as shown in FIG. 4(a).

Specifically, as shown in (b) of FIG. 4, the intersection data comprises intersection names corresponding to the intersections numbers I-IV, road numbers having the smallest numbers among those roads possessing a certain intersection as a starting point, road numbers having the smallest numbers among those roads possessing a certain intersection as an end point, and information indicating whether or not a certain intersection has a traffic signal.

As shown in (c) of FIG. 4, the road data comprises starting and end points, in the form of intersection numbers, of the road numbers ① through ⑧, the numbers of roads having the same starting point, the numbers of roads having the same end point, road width, information relating to prohibitions, information relating to guidance not required, photograph numbers, the numbers of nodes, the leading addresses of node series data, length, etc.

As shown in (d) of FIG. 4, the node array data comprises information relating to east longitude, north latitude, attributes and the like. The units of the road numbers comprise a plurality of nodes, as is evident from the road data. More specifically, the node data is data relating to one point on a road. If a line connecting nodes is referred to as an arc, a road is expressed by connecting each of a plurality of node arrays by arcs. For example, with regard to road number ①, the road comprises 15 nodes and the leading address of the node array data is 100, based on the road data. Therefore, road number ① is composed of node data having addresses 100 to 114.

Assume a case where the intersection is intersection number I, for example. For a course having this intersection as a starting point, in accordance with these network data, first road number ① is retrieved from the starting point information of the intersection point data, then road number ⑦ is retrieved from the road data relating to the road number ①, namely from the column reading "NO. OF ROAD HAVING SAME STARTING POINT". Since the same information for road number ⑦ will, in converse fashion, lead to retrieval of road number ①, it can be determined that there are no other road numbers available as peripheral roads. The same will hold true with regard to end points. Further, since road number ⑥ will be prohibited in case of road number ⑤ in the road data, the vehicle will not be able to enter road number ⑥ from road number ⑤ at the intersection number IV shown in FIG. 4(a) because turns are prohibited at this intersection. The only road that can be entered is the road number ⑧. Accordingly, guidance to road number ⑧ is unnecessary.

Upon being provided with inputs of present position and destination, the course exploration unit 13 performs course exploration by referring to the intersection data, road data and node data mentioned above.

FIG. 5 illustrates data generated by course retrieval, in which (a) is intersection series data and (b) is node series data. The intersection series data comprise information such as intersection name, intersection number, photograph number of a photograph showing the characteristic scenery of the intersection, angle of turn, distance and the like. The node series data comprise information such as east longitude and north latitude representing a node position, intersection number, attribute, angle, distance and the like. Moreover, these data comprise data indicative solely of intersections requiring guidance; data relating to intersections not requiring guidance are excluded. Accordingly, for navigation, it will suffice to read out at any time the course data, which are thus generated by the guidance processor 15, in conformity with the position of travel, and also read out, as necessary, photograph data and map data and display these on the display unit 31.

Thus, in accordance with the invention, vehicle travel is accurately grasped while precisely identifying present position at all times based on the intersection data, road data and node series data.

Figure 6:
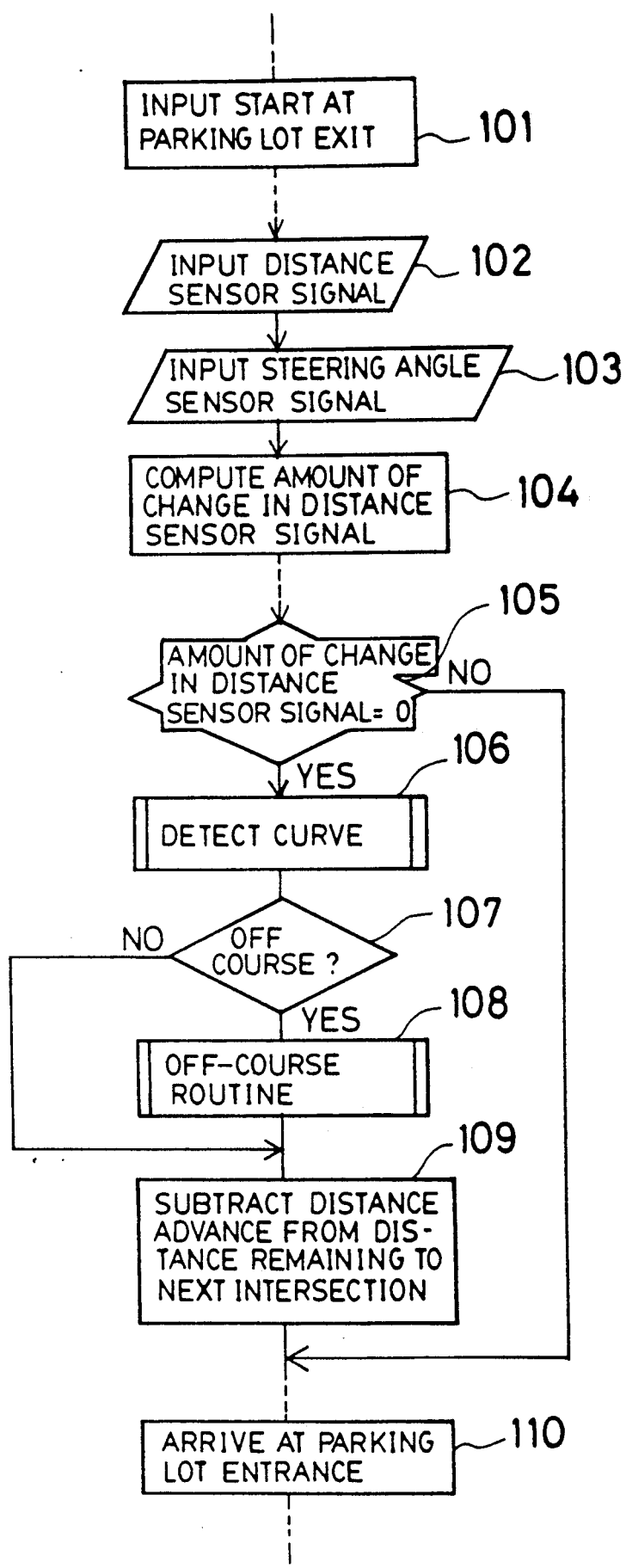
FIGS. 6, 7 and 8 are views for describing navigation processing according to the invention.

Navigation according to the present invention will now be described in accordance with the flowchart of FIG. 6.

First, a parking lot exit where the vehicle is usually parked is inputted as the starting point, namely the position at which the vehicle is initially located (step 101). Next, detection values are read in from the distance sensor and steering angle sensor (steps 102, 103), and the amount of change in the value detected by the distance sensor is computed (step 104). If it is detected that the vehicle is travelling without the amount of change in the value detected by the distance sensor being 0, a curve detection routine, described below, is traversed (step 106). If a curve is not detected between intersections, present position is calculated by the distance sensor on the assumption that the vehicle is proceeding along the course without turning. If a curve is detected, whether or not the same type of curve is present on the course near the present position is investigated by comparing angles based on the node series data and calculating the difference between angles. If the same type of curve is present, a decision is rendered to the effect that the vehicle is travelling on the course; if such a curve is absent, a decision is rendered to the effect that the vehicle has gone off course. In a case where a curve is detected in the vicinity of a guidance intersection at which a turn should be made, it is decided that the vehicle made a turn on the course in the correct direction if the difference between the angle in the direction of travel and a detected angle is less than a fixed value; if the difference between the angles is greater, then it is decided that the vehicle is off course. In a case where a curve is not detected even when the vehicle advances a fixed distance through the vicinity of an intersection, it is judged that the vehicle has strayed off course by passing through the intersection. After these off-course routines are traversed (steps 107, 108), travelled distance is subtracted from distance remaining to the next intersection (step 109) to calculate present position, and a display is presented for guidance to the next intersection. By repeating this processing, the vehicle will arrive at the entrance to the parking lot at the destination (step 110).

Figure 7:
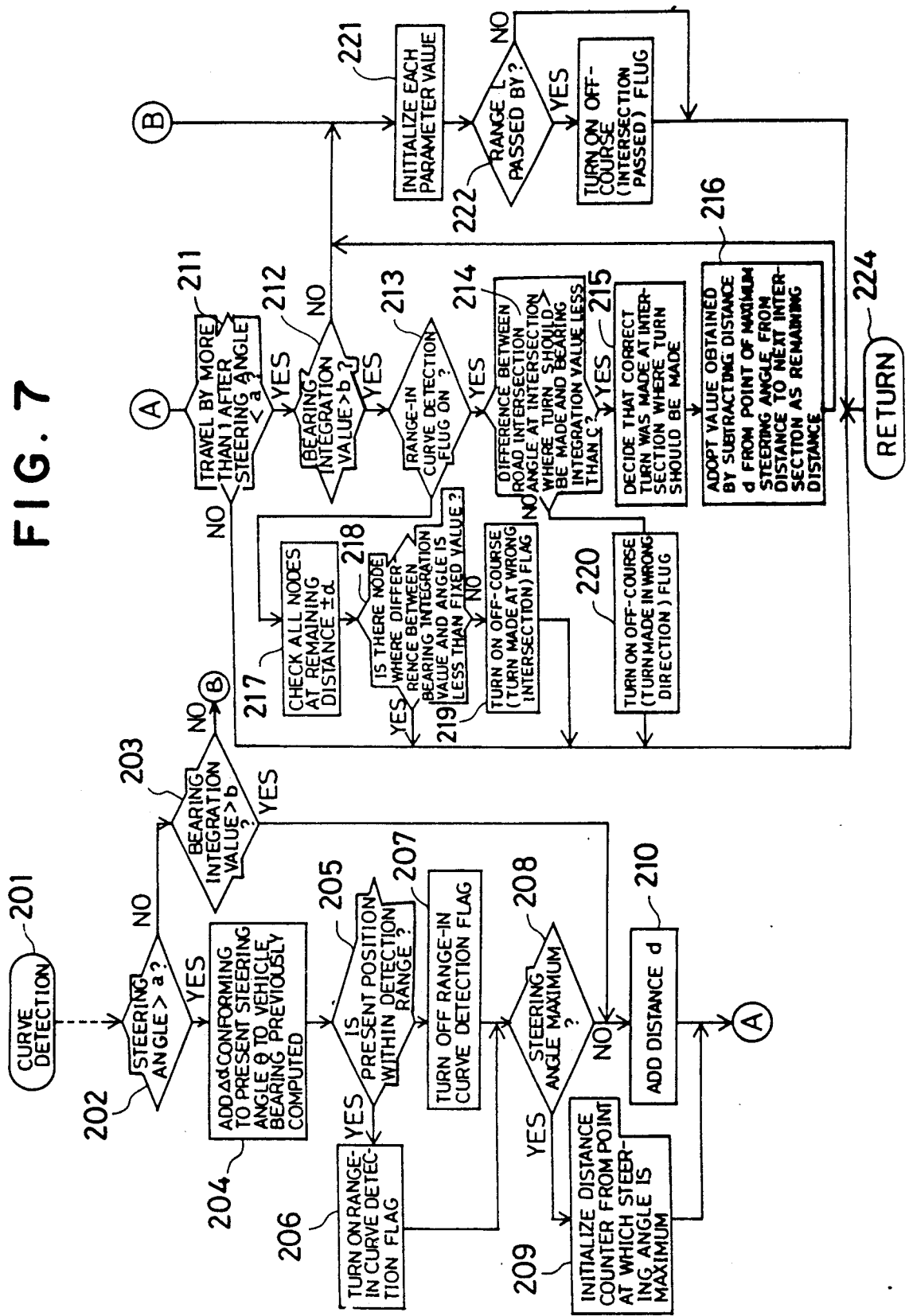

The curve detection routine will be described based on FIG. 7.

First, the program enters the curve detection routine at a start step 201 and determines whether the steering angle is greater than a predetermined value a (step 202). If the steering angle is greater, a change Δα in the direction of travel commensurate with the present steering angle is added to the last heading of the vehicle (step 204), and it is determined from the travelling distance data whether the present position is within the detection range L from the intersection at which a turn should be made (step 205). If the present position is within the range L, a range-in curve detection flag is turned ON (step 206). If the present position is not within the range L, then the range-in curve detection flag is turned OFF (step 207). Next, it is determined whether the steering angle θ is maximum or not (step 208). When the steering angle is maximum, a distance counter is initialized (step 209) in order to count the distance from the point at which the steering angle is maximum. If the steering angle is not maximum, then it is determined that a turn was not made at the intersection and distance d is added on (step 210), after which the program proceeds to step 211. This processing is such that if the vehicle is turned correctly at an intersection where the turn should be made, a distance correction is applied with the point of maximum steering angle serving as the intersection, after which distance from this point is calculated to obtain the present position. In a case where the steering angle is found to be less than the predetermined value a (no left or right turn) at step 202, it is determined whether the integrated value of the change in travelling direction calculated based on the steering angle-travelling direction conversion table is greater than a predetermined value b (step 203). If the change in travelling direction is greater than the predetermined value, the program jumps to step 210. If it is determined at step 203 that the change in heading is not greater than the predetermined value, each parameter value is initialized and it is determined whether the vehicle has gone past the range L of the guidance intersection (step 222). If it has, an off-course flag is turned ON; if it has not, the program returns.

Next, it is determined at step 211 whether the vehicle has travelled by more than 1 after the steering angle has become smaller than the value a. If it has not travelled by more than 1, the program jumps to step 224 and returns. If the vehicle has travelled by more than 1, it is judged that the steering wheel has been returned to end the left or right turn and then it is determined whether the integrated value of the change in travelling direction calculated based on the steering angle-travelling direction conversion table is greater than the predetermined value b, thereby judging whether the change in travelling direction is greater than the predetermined value (step 212). If the value is smaller than the predetermined value b, each parameter value is initialized and it is determined whether the vehicle has gone past the range L of the guidance intersection (step 222). If it has, an off-course flag is turned ON; if it has not, the program returns. If the change in travelling direction is greater than the predetermined value at step 212, it is determined whether the range-in curve detection flag is ON (step 213). When the flag is ON, it is determined whether the difference between the road intersection angle at the intersection at which a turn should be made and the detected angle is less than a fixed value c (step 214). If the difference is greater than the fixed value, it is decided that the vehicle has strayed off course by turning in the wrong direction and the off-course flag is turned ON (step 220). If the difference is less than the fixed value, it is decided that the vehicle turned correctly at the intersection where the turn should be made (step 225), a value obtained by subtracting the distance d from the point of maximum steering angle from the distance to the next intersection is adopted as remaining distance (step 226), each parameter value is initialized (step 221) and it is determined that the vehicle has not gone past the range L of the guidance intersection. Accordingly, the program returns.

When the vehicle is not in the vicinity of a guidance intersection and the range-in curve detection flag is not ON at step 213, all nodes at the remaining distance ±α are investigated (step 217) and it is determined whether there is a node at which the difference between an integrated value of bearing and the angle is less than a fixed value (218). When there is such a node, it is judged that the vehicle is not off course but is on a curve along the course which does not call for a left or right turn at the intersection. As a result, the program returns. When there is no node satisfying the foregoing conditions, it is judged that the vehicle has strayed off course due to a turn at the wrong intersection (step 219).

The foregoing processing makes it possible to detect that the vehicle is off course by curve detection at a guidance intersection as well as between guidance intersections.

Figure 8:
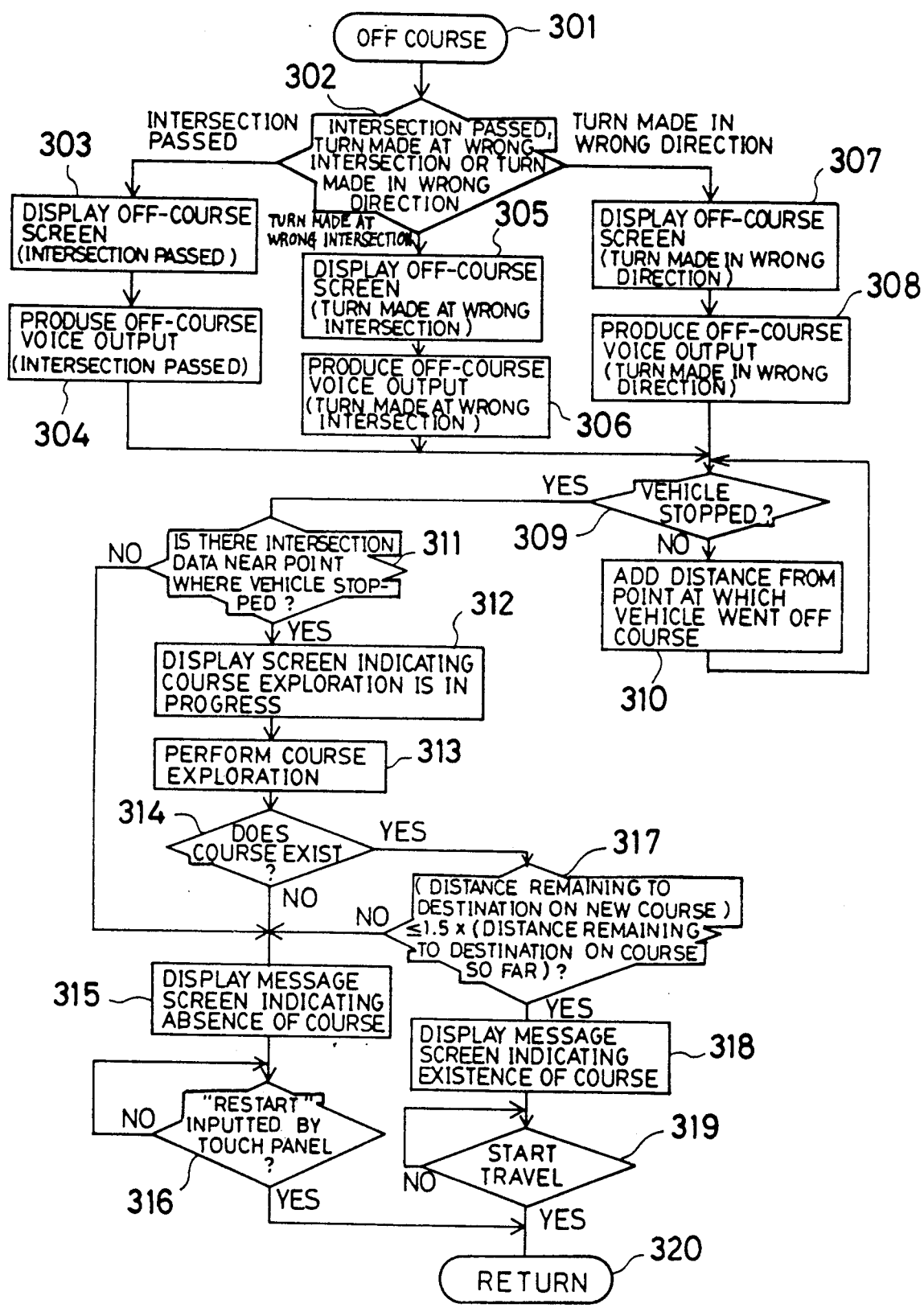

The off-course routine will now be described with reference to FIG. 8.

The program enters the off-course routine at a start step 301, and it is determined whether the vehicle has passed through an intersection at which a turn should be made, turned at the wrong intersection or turned in the wrong direction (step 302). When it is judged that the vehicle has passed through an intersection at which a turn should be made (see step 223 in FIG. 7), an off-course display indicating this fact is presented, as illustrated in FIG. 9(a), and a voice track is broadcast to the inform of the fact that the vehicle has gone off course by passing through the intersection (steps 303, 304). When it is judged that the vehicle has turned in the wrong direction (see step 220 in FIG. 7), an off-course display indicating this fact is presented and a voice track is broadcast to the inform of the fact that the vehicle has gone off course (steps 307, 308).

Figure 9C:
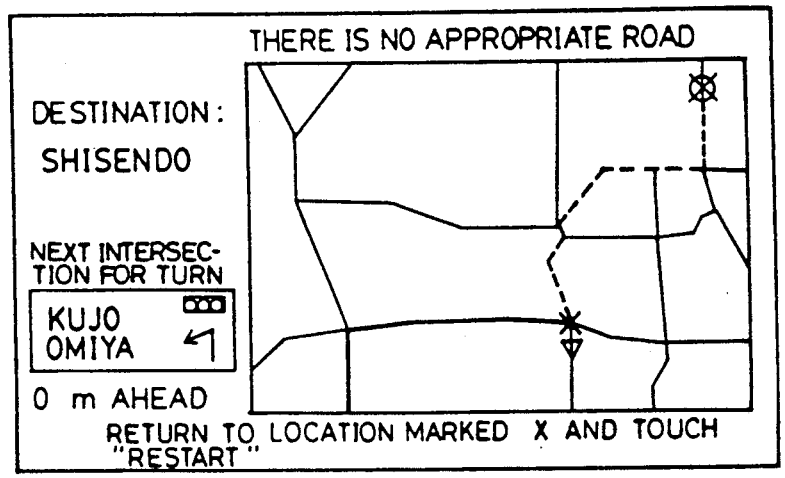
Figure 9D:
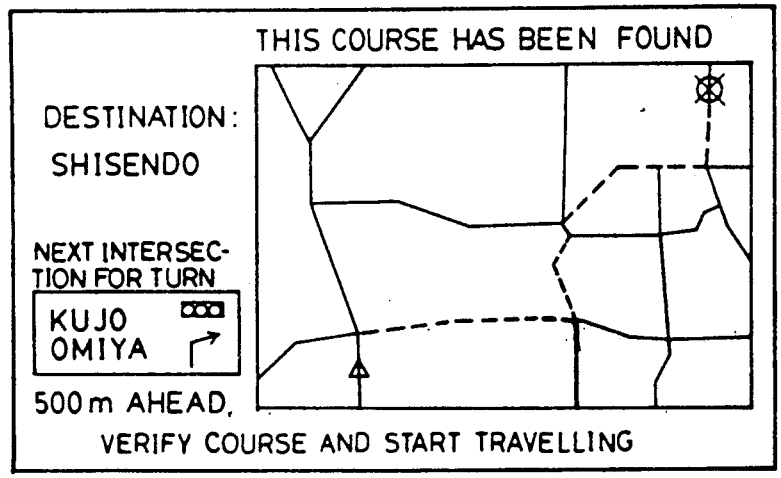

In either case, when the vehicle strays off course, a display is presented calling for the vehicle to be stopped, and it is determined whether the vehicle has stopped (step 309). Distance from the point at which the vehicle went off course is added up until the vehicle stops (step 310). When the vehicle has stopped, it is determined whether there is data relating to a guidance intersection in the vicinity (step 311). When such guidance intersection data exists, a display to the effect that course exploration is in progress is presented on the screen, as shown in FIG. 9(b), and course exploration is performed (steps 312, 313). It is then determined whether a new course exists (step 314). If there is such a course, the distance remaining to the destination on the new course is compared with a distance calculated by multiplying the distance remaining to the destination on the course traversed so far by a coefficient, e.g., 1.5 (step 317). If the new course is not longer, a message screen having the course is displayed, as shown in FIG. 9(d) (step 318), and travel starts (step 319). If no intersection is found at step 311, no course is found at step 314 or the new course is longer than the distance obtained by multiplying the remaining distance by the coefficient, then a message indicating the absence of a course and an instruction message indicating that the vehicle should return to the point at which it went off course and that "RESTART" should be touched are displayed, as shown in FIG. 9(c) (step 315). The vehicle is returned to the point at which it went off course and "RESTART" is entered by the touch panel (step 316). This makes it possible to return to navigation on the original course.

In accordance with the present invention as described above, a curve detected by a steering angle sensor and distance sensor is compared with an angle at a guidance intersection or node, thereby determining whether the vehicle has turned at an intersection or node on the course. A distance correction is performed based upon the intersection or node at which the correct turn was made, distance from the intersection at which the last turn was made is calculated and present position is thus obtained. Since the steering angle sensor is employed as a sensor, there is no influence from external disturbances so that present position can be confirmed precisely and through a simple arrangement. Since node data are used, a correction can be performed with little course data so that processing speed can be greatly improved.

In a case where it is determined based on intersection data and node data that the vehicle has strayed off the predetermined course, the driver is informed of the fact and is given subsequent instructions. When necessary, the driver is guided along a new route or is instructed to return to the point at which the vehicle went off course. As a result, the driver immediately knows when the vehicle goes off course and suitable instructions are given without it always being required that the vehicle return to a previously traversed point. By obeying the instructions given, the driver can arrive at the destination quickly and is capable of driving the vehicle without anxiety.

INDUSTRIAL APPLICABILITY

The vehicular navigation apparatus of the present invention enables the driver to be informed of present position with facility even when travelling in a region in which guidance is not provided. If the vehicle should stray from a predetermined course, instructions are given for subsequent actions so that the driver can travel to the destination with assurance. The invention therefore is applicable to various vehicles such as rental cars, taxis and ordinary passenger cars.

What is claimed is:

1. A vehicular navigation apparatus comprising:
a distance sensor for detecting distance travelled and for generating a distance signal;
a vehicle travelling angle sensor for generating a signal for vehicle travelling angle;
a curve detecting unit, provided with inputs of the distance signal and the travelling angle signal, for determining unit changes in vehicle travelling direction per unit of detected distance by applying said vehicle traveling angle signal to a travelling angle-travelling direction conversion means and for integrating said unit changes to obtain a value for travelling direction change;
an exploration unit for receiving inputs of present position and destination and for retrieving a predetermined travelling direction change at an intersection or node based on position data and direction data;
a comparison-decision unit for comparing the retrieved predetermined travelling direction change data with the value for change in vehicle travelling direction determined by said curve detecting unit; and
a guidance processor for providing predetermined guidance responsive to the results of said comparing.

2. A vehicular navigation apparatus according to claim 1, wherein the guidance processor calculates said present position by computing a distance correction based on intersection position data or node position data when the difference between an angle of an intersection or node of the retrieved data and the angle of said determined travelling direction change is less than a predetermined value.

3. A vehicular navigation apparatus according to claim 2, wherein the present position is computed by determining distance from the intersection at which the last turn was made, said intersection being taken at a geographical point at which the vehicle travelling angle is maximum.

4. A vehicular navigation apparatus according to claim 1, wherein the guidance processor provides an off-course indication and guidance instructions when it is determined that the vehicle is not on a predetermined course by comparing said retrieved predetermined travelling direction change with said value for travelling direction change.

5. A vehicular navigation apparatus according to claim 4, wherein the off-course indication and the guidance instructions provided by the guidance processor are given in the form of a display or voice output.

6. A vehicular navigation apparatus according to claim 4, wherein, when the vehicle is detected to be off course, the vehicle is stopped and a new course from a geographical point at which the vehicle is stopped to said destination is found, the guidance processor compares the new course and an original course and, based on the results of the comparison, gives instructions for travel in accordance with the new course or to return to a geographical point at which the vehicle went off course.

7. A vehicular navigation apparatus according to claim 4, wherein, when the vehicle is detected to be off course, the vehicle is stopped and a new course from a geographical point at which the vehicle is stopped to said destination cannot be found, the guidance processor gives instructions for return to a geographical point at which the vehicle went off course.

8. A vehicle navigation apparatus according to claim 1, wherein the curve detecting unit integrates said unit changes in vehicle travelling direction when the vehicle travelling angle exceeds a predetermined value.

9. A vehicle navigation apparatus according to claim 1, wherein said curve detecting unit determines whether a turn has been made or not after travelling a predetermined distance from an intersection or node.

10. A vehicle navigation apparatus according to claim 1, wherein the exploration unit performs course exploration.

11. A vehicular navigation apparatus according to claim 3, wherein said guidance processor includes means for calculating said present position.

* * * * *

UNITED STATES PATENT AND TRADEMARK OFFICE
CERTIFICATE OF CORRECTION

PATENT NO. : 5,043,902
DATED : August 27, 1991
INVENTOR(S) : YOKOYAMA et al

It is certified that error appears in the above-identified patent and that said Letters Patent is hereby corrected as shown below:

Title page, item [73]

The name of the assignee "KABUSHIKI KAISHA SINSANGYOKAIHATSU" should read --KABUSHIKI KAISHA SHINSANGYOKAIHATSU--.

Col. 2, line 40, "compring" should read --comparing--.

Col. 8, lines 43 and 49, delete "the".

Col. 9, line 65, "traveling" should read --travelling--.

Signed and Sealed this

Thirtieth Day of March, 1993

Attest:

STEPHEN G. KUNIN

Attesting Officer

Acting Commissioner of Patents and Trademarks